Figure 3:
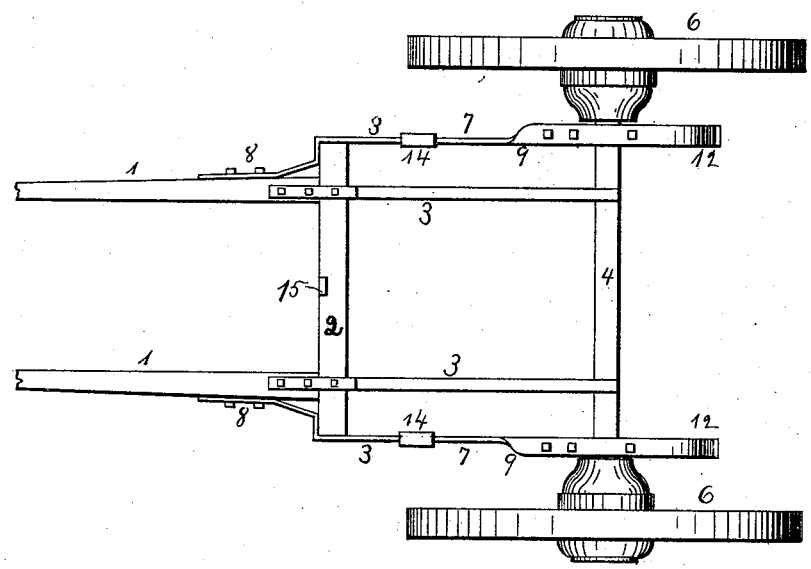

(No Model.) 2 Sheets—Sheet 1.
D. M. HOLMES.
ASH CART.
No. 479,760. Patented July 26, 1892.
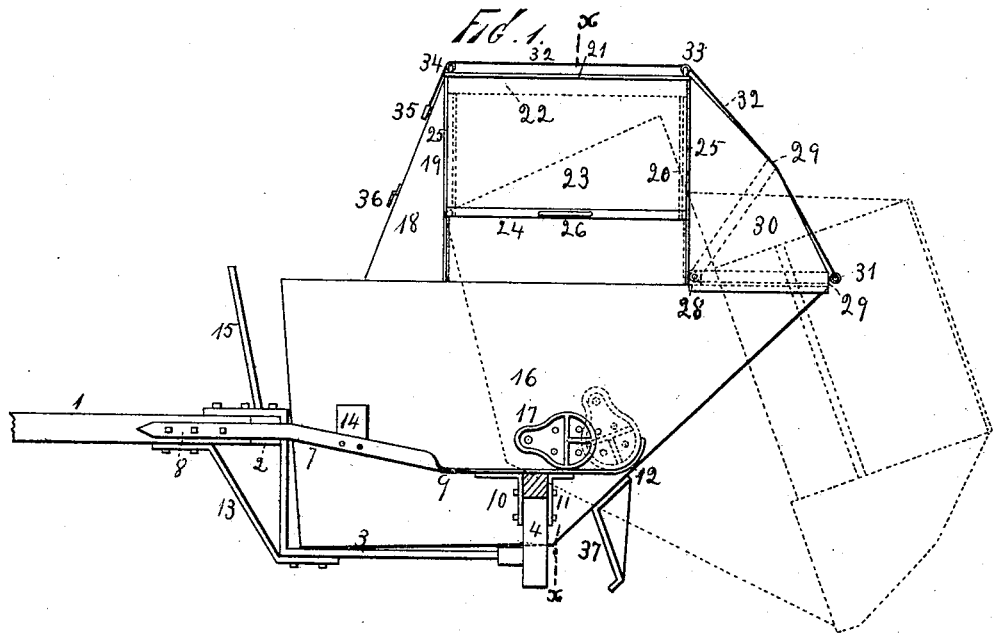
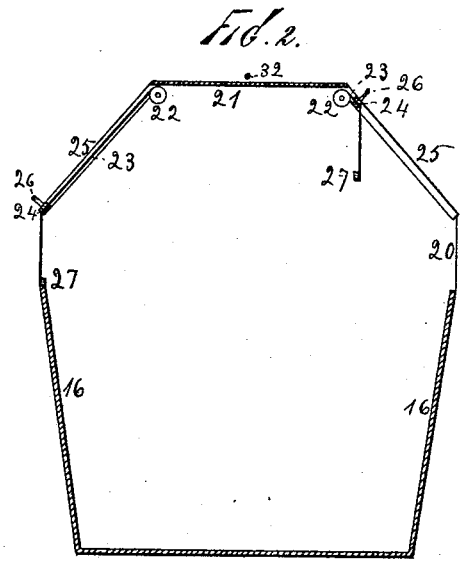
Witnesses
John Buckler,
J. Chester.
Inventor
D. M. Holmes
By his Attorney
A. M. Pierce (No Model.) 2 Sheets—Sheet 2.
D. M. HOLMES.
ASH CART.
No. 479,760. Patented July 26, 1892.

Witnesses
Jno. Buckler,
J. Chester.

Inventor
D. M. Holmes.
By his Attorney
A. M. Pierce.

UNITED STATES PATENT OFFICE.

DANIEL M. HOLMES, OF ARLINGTON, NEW JERSEY.

ASH-CART.

SPECIFICATION forming part of Letters Patent No. 479,760, dated July 26, 1892.

Application filed October 30, 1891. Serial No. 410,312. (No model.)

*To all whom it may concern:*

Be it known that I, DANIEL M. HOLMES, a citizen of the United States, residing at Arlington, in the county of Hudson and State of New Jersey, have invented new and useful Improvements in Carts, of which the following is a specification.

My invention relates especially to the construction and arrangement of the supporting-frame for cart-bodies, particularly to those employed for collecting dirt, dust, ashes, &c., and has for its object the provision of a simple, cheap, durable, and effective cart frame and body.

To attain the desired end my invention involves certain novel and useful combinations or arrangements of parts and peculiarities of construction and operation, all of which will be hereinafter first fully described, and then pointed out in the claims.

In the drawings, Figure 1 is a side elevation of my improved cart frame and body, the position which the body will occupy when tipped being shown by the dotted lines in said figure. Fig. 2 is a cross-sectional view of the cart-body at line $x$ $x$ of Fig. 1. Fig. 3 is a plan view of the supporting-frame with the cart-body removed.

Similar numerals of reference, wherever they occur, indicate corresponding parts in all the figures.

1 1 are the shafts, connected to a cross-piece 2.

3 3 are metal bars bolted to the cross-piece 2 and shafts 1, as shown, extending downward at a substantially right angle and then horizontally, being connected to the axle 4. The said axle is formed of a crank shape near the wheel in order to carry the center of the cart-body very low down.

6 6 are the wheels.

7 7 are metal bars bolted to the sides of the shafts at 8, extending with the narrow edge, as shown, back from the piece 2 to 9, when the said bar is given a half-twist and passes over the axle, being firmly held in place by knees 10 and 11, secured thereto and to the axle. Bar 7 terminates in a curved projection 12.

13 is a brace passing from beneath a shaft to the lower side of bar 3.

14 14 are guides secured to bar 7 for the purpose of directing the cart-body to its seat.

15 is a standard projecting upward from the cross-piece 2.

16 is the cart-body, made of any approved material and provided at each side with rocking pieces 17, which rest upon the piece 7, supporting the cart near its center of gravity, the front resting against the cross-piece 2.

The top of the cart is entirely inclosed and is provided with simple means for opening either side or the back part of the covering for the purpose of loading.

18 is the front piece of the cover.

19 20 are metal uprights, which pass from the body of the cart first vertically and then at an angle to the top piece 21.

Mounted at the top of the opening between uprights 19 and 20 is a spring-roller 22, carrying a heavy canvas curtain 23.

At 24 a cross-piece is secured to curtain 23, said cross-piece projecting beneath guides 25, mounted upon uprights 20 and 19.

26 is a manipulating-handle fixed to piece 24. The curtain 23 extends below piece 24 and carries a bar 27 across its lower edge. At the rear of the cart-body, upon each side, are mounted ears 28, (indicated in dotted lines in Fig. 1,) bows 29 being pivoted to said ears.

30 is a flexible cover stretched over said bows and secured to the top 21 and the uprights 20.

31 is an eye, to which is secured a cord 32, passing over pulleys 33 and 34, terminating in a knob 35.

36 is a catch-piece with which said knob is designed to engage.

When constructed and arranged in accordance with the above description, my cart frame and body will be found admirably adapted to the uses and purposes for which they are intended. From its peculiar construction the supporting-frame is thoroughly braced and the body is supported and held in all directions, while it is free to tip when desired. The body is supported by the rocking trunnions in such a manner that in tipping the body is carried backward, the trunnions finding bearings upon the horizontal bars 7, the limit of movement being obtained by the curved portions 12. If it is desired to introduce dirt, dust, &c., into the cart-body at the side, the spring-roller will draw the upper portion of the side curtain up, permitting the lower part of the curtain to hang free and out of the way, as shown in Fig. 2, while when the curtain is drawn down the side opening will be effectually closed, preventing the escape of dust. When it is desired to introduce the material to be moved at the rear of the cart, cord 32 is drawn forward and the knob upon the end thereof passed beneath the catch 36, thus raising the cover 30 and holding it open, and when the load is to be dumped the said cover is to be raised in the same manner.

37 is a hook at the bottom of the cart-body for bearing against the axle when the cart tips. This hook passes beneath the axle and prevents the raising of the bearings from their seats when the cart-body tips backward.

Having now fully described my invention, what I claim as new therein, and desire to secure by Letters Patent, is—

1. The combination of a cart supporting and inclosing frame mounted upon an axle, said frame having upwardly-projecting stops at each side thereof, and a cart-body supported within said frame at the front and upon rocking trunnions secured to the sides of the body, as set forth, whereby when the body is tilted the trunnions will rock backward in a fixed course upon the sides of the body inclosing the frame, substantially as shown and described.

2. The combination, with a cart-body having a closed top, of curtains mounted upon spring-rollers and forming a portion of said top, substantially as shown and described.

3. In a cart-body of the character herein specified, the combination, with the fixed portions of the top of the body, of curtains mounted upon spring-rollers, said curtains being held in place and arranged to operate substantially as shown and described.

4. In a running-gear and supporting-frame for carts, shafts secured to a cross-piece, downwardly and backwardly extending bars connected to the cross-piece and shafts and to a bent axle, and brace-bars extending from the shafts around the cross-piece to which the shafts are connected and then to the axle near the wheels, the whole combined and arranged substantially as shown and described.

5. A running-gear and support for cart-bodies, in which is comprised a bent axle, braces passing from the highest parts of the axle to the sides of the shafts, a cross-piece and shafts secured thereto, bars extending from the shafts and cross-pieces downward and then backward to the depressed portion of the axle, and braces passing from the lower sides of the shafts to said bars, the whole combined and arranged substantially as shown and described.

6. The combination, with the cart-body and the supporting-axle, of stop-hooks upon the body, adapted and arranged to bear against the axle and pass therebeneath when the body is tipped, substantially as shown and described.

DANIEL M. HOLMES.

Witnesses:
A. M. PIERCE,
I. CHESTER.